United States Patent Office 3,019,090
Patented Jan. 30, 1962

3,019,090
CORROSION TEST
William G. Renshaw, Natrona Heights, Roy C. Bongartz, Pittsburgh, and Jack M. Beigay, Brackenridge, Pa., assignors to Allegheny Ludlum Steel Corporation, Brackenridge, Pa., a corporation of Pennsylvania
No Drawing. Filed Dec. 8, 1959, Ser. No. 858,038
5 Claims. (Cl. 23—230)

This invention relates to the testing of stainless steel for its corrosion resistance and relates in particular to a test for determining the presence or absence of corrosion-promoting imperfections, scale and/or free iron on the surface of stainless steel.

In the production of stainless steel and particularly the straight chromium (10% to 40% chromium) stainless steels, such as AISI type 430 strip or sheet products, it is found that the material is frequently inconsistent in its corrosion resistance behavior. Although the surface of stainless steel sheet or strip may appear to be uniform from lot to lot, in actual service it is well known that some lots or coils of such stainless steel will develop numerous spots of corrosion or pitting, while other lots and coils produced in an apparently identical manner will prove to be far superior in resisting such corrosive attack. Such inconsistency in corrosion resistance is attributed to several causes, including the possible presence of free iron and/or residual microscopic flakes of scale adhering to the steel surface which was not completely removed during pickling and surface imperfections, such as pits and voids, that vary in frequency from lot to lot.

It is necessary for the producers of straight chromium stainless steel strip, and particularly type 430 stainless steel strip to test each coil produced for its susceptibility to this type of corrosion and to replace or surface condition those coils that do not measure up to the standard determined by the stainless steel industry. Present tests employed for this purpose are undesirable because of the long testing time required. A successful test must be rapid so that production will not be interrupted and the tested coil may be sent on for shipment or sent back for reconditioning promptly. To date, the only really successful tests are salt spray tests, wherein aqueous solutions of corrosive salts are transformed into a spray or fog in the presence of stainless steel test panels. Although such testing affords a relatively accurate measurement, the time periods required to obtain reliable results range from about 16 hours to 48 hours. Such a time-consuming test is not practical in modern rapid production, and hence a reliable short-time test has long been sought.

A highly desirable and effective test should require only about 30 seconds, and one such test developed as the American Society for Testing Materials specification, involving a ferricyanide solution, has constituted a vast improvement over the salt spray method, but this test only indicates the amount of free iron on the surface of stainless steel. The problems involved in the production of type 430 stainless steel are more frequently due to surface defects and other causes than the mere presence of free iron, so that the American Society for Testing Materials specification has proved to be an inadequate replacement for the long-time salt spray test.

It has now been found that a critically balanced ferricyanide test solution prepared in accordance with the present invention effects a short-time corrosion test substantially equivalent to that obtained by the long-time salt spray testing of the straight chromium stainless steels.

It is, therefore, the object of the present invention to provide a rapid method of determining the corrosion resistance of stainless steel surfaces that is equivalent in such determination to salt spray tests.

A further object of the present invention is to provide a rapid method of determining the corrosion resistance of AISI Type 430 sheet or strip.

In general, the present invention relates to the process of testing stainless steels, which consists of immersing a liquid-absorbing material in an aqueous ferricyanide solution containing nitric and hydrochloric acid, contacting the surface of the stainless steel to be tested with the absorbing material and subsequently removing the absorbing material from the surface of the stainless steel to evaluate the resulting blue spots effected on the absorbing material, which are indications of potential spots of corrosion. The invention is particularly directed to a method of testing the corrosion resistance of AISI type 430 stainless steel sheet and strip products wherein a piece of flat absorbing material is saturated with an aqueous solution that contains at least .1%, by weight, sodium or potassium, ferricyanide and nitric and hydrochloric acid in amounts equivalent to from about 1% to 10%, by volume, of the concentrated acids (70% by weight, $HNO_3$, 37%, by weight, HCl) in a ratio of about 1 part nitric to 2½ parts of hydrochloric. The flat absorbing material is placed on the surface of the stainless steel to be tested and is permitted to remain for a period of from about 10 seconds to 3 minutes. It is then removed and the corrosion potential of the type 430 stainless steel is determined from the number of blue spots or general blue areas appearing on the surface of the absorbing material. Although the temperature of the test of the present invention may be adjusted, it is preferably conducted at room temperature or about 80° F.

Corrosion tests, in general, such as the aforementioned salt spray test, the accelerated tests that are sometimes claimed to reproduce the effects of salt spray, and also including the test of the present invention, act to induce rust spots or simulated rust spots effected by the reaction of chemicals imparting a visible color to the corrosion or corrosive potential areas of the steel surface. The salt spray tests will effect the corrosion of these areas regardless of the origin, whether such origin be free iron, flakes of scale, or defective or pitted surfaces. The known accelerated spot tests, however, have a great tendency to identify only one type of defect. Test results of all these tests are based on the number of rust spots or spots indicating corrosion as well as the general corrosion of the metal surface. In the present test, an absorbing material that is at least partially saturated with the test solution is applied to the surface to be tested. The absorbing maerial is removed from the surface of the stainless steel at the conclusion of the desired time period (10 to 180 seconds). Observations are immediately made of the condition of the absorbing material after its removal. Small scattered blue spots on this material indicate the possible presence of pits and voids in the steel surface or scattered scale and/or free iron particles remaining on the surface. More or less, overall blue coloration or large areas of blue coloration indicate gross scale and/or free iron contamination or possibly a badly pitted surface. A high frequency of spots or the presence of large blue areas would indicate a material which would undoubtedly have poor resistance to atmospheric surface attack. The absence or substantial absence of blue spots or blue areas would indicate a very good corrosion resistant surface.

The absorbing material applied in the present tests may be any material capable of taking up the test solutions and presenting a test solution wet surface to the surface of the stainless steel being tested. Such material may be cloth, paper or any other material capable of absorbing such solution. It is preferable that this material be flat, such as cloth or paper, so that it may be laid upon the surface of the stainless steel and effect a more positive test condition. It is necessary that this material be relatively clean or free of contamination that would interfere in the test procedure. For example, such material must not contain free iron or a false test will be effected. Excellent results have been obtained by employing photographic paper and laboratory filter papers. The area to be contacted by the absorbing material and thus the size or dimensions of this material are determined by the area to be tested and must, as in all such tests, be consistent in order to obtain consistent results to permit comparative observations.

The test solution itself must contain ferricyanide ions, in that it is the chemical reaction which this material enters into that forms the necessary coloring or blue spots that are indicative of potential corrosion on the steel surface. It is preferred that the ferricyanide be applied to the test solution in the form of the potassium or sodium compound since these compounds are the most readily available and are soluble in aqueous solutions. The quantity of the material is not critical, in that any quantity will effect some visible color in the vicinity of the corrosion susceptible areas; however, it has been found to be preferable to employ at least about .1% by weight, of ferricyanide compound, in that less than this amount may produce an excessive number of spots on the absorbing material.

A critical feature of the present invention is the addition of nitric and hydrochloric acid to the test solution. It has been found that a total acid content, by volume, of the concentrate acids (70%, by weight, $HNO_3$ and 37%, by weight, HCl), of up to about 10% may be employed and that amounts as low as 1%, by volume, of the concentrate acid are effective. The probable action of the hydrochloric acid tends to attack the type 430 base metal while the $HNO_3$ present tends to inhibit this attack. By obtaining the proper balance between the two acids, the hydrochloric acid is prevented from attacking all but the areas which would be susceptible to corrosive attack. It has been found that the ratio of nitric acid to hydrochloric acid must be approximately 1 to 2.5, plus or minus about .25, of the concentrate acids (70% $HNO_3$, 37% HCl). The foregoing ranges, it will be noted, are based on volume additions to aqueous solutions. This is done because such acids are readily available in this form; however, it is obvious that aqueous additions in forms other than concentrated acid may be employed so long as the total acid added is equal to that enumerated. The total acid content, by weight, would be within the range of from approximately .5% to 5%, and the ratio of nitric acid to hydrochloric acid would be approximately 1 to 1.25 (plus or minus about .1).

The time of testing is not critical, in that such time depends on the exact strength of solutions being employed, the temperature, etc. However, for consistent results, it is preferable to use a consistent time as well as consistent test solution concentrations and temperatures. For practical purposes and for purposes of this test, it is highly preferred to employ a time of from not less than about 10 seconds to permit an effective reaction to show positive test results up to about 3 minutes to avoid excessive amounts of time that may interrupt production schedules. The time interval which will be most desirable would preferably be of the same order as the 30 second ferricyanide test for free iron described in the A.S.T.M. testing procedures.

The temperature at which the test is conducted is not critical in that any temperature may be employed so long as the temperature so used is consistent. Optimum re-results will be obtained at various temperatures depending on the variables of solution, concentration, time, etc. For example, one of the salt spray tests (a fog of an aqueous solution of 5% NaCl, 5 grams of $CuCl_2$ per 5 gallons of water, pH adjusted to 3.2 with acetic acid) is frequently accelerated by employing temperatures of about 120° F. It is possible to employ such a temperature while carrying out the test of the present invention to correlate test results with the results obtained with the accelerated salt spray test. Good results have been obtained by applying a test solution saturated paper (1%, by weight, $K_3Fe(CN)_6$, 1.25%, by volume, 37%, HCl and .5% by volume, 70% $HNO_3$) to the stainless steel surface to be tested and placing the test area under a heat lamp (a 250 watt infrared heat lamp placed six inches from the surface of the test) for a time period of 30 seconds. The surface of the sample under the paper was brought to a temperature of 120° F.–135° F. The results of tests conducted in this manner have provided close agreement with the accelerated (120° F.) salt spray test.

As in any corrosion testing, it is preferable and, in fact, necessary to duplicate the variables of the test each time it is employed for comparative results. Excellent results have been obtained by employing the following specific solution and procedure:

1.0 g. $K_3Fe(CN)_6$ per 100 ml. of solution
0.5 ml. $HNO_3$ (70% by weight) per 100 ml. of solution
1.25 ml. HCl (35.5% by weight) per 100 ml. of solution
Water added to bring volume to 100 ml.

A test solution saturated piece of filter paper is placed in intimate contact with the metal surface at room temperature for 30 seconds, after which the paper is removed and examined for the existence of blue areas. Small scattered blue spots on the filter paper indicate the presence of pits and voids, scattered scale and/or free iron particles remaining on the surface. More or less overall blue coloration or large areas of blue indicate gross scale and/or free iron contamination. A high frequency of spots or the presence of large blue areas indicates material which would probably have poor corrosion resistance to atmospheric surface attack. The absence of blue spots would indicate a very good surface.

The following specific examples are given to illustrate the test of the present invention and in no way limit the specifications or claims to the exact embodiments set forth:

Light gauge six-inch square panels of AISI type 430 stainless steel strip were subjected to the preferred test procedure outlined above. Similar samples were subjected to 48 hours of salt spray testing (a fog of 20%, by weight, NaCl in water at room temperature). Comparative results of the number of corrosion spots and test spots resulting from these tests are shown below in Table I:

*Table I*

COMPARATIVE EXAMPLES OF TYPE 430 CORROSION RESISTANCE DETERMINED BY 30 SECOND $K_3Fe(CN)_6$ SPOT TESTS AND 48 HOUR SALT SPRAY TESTS

| 1% $K_3Fe(CN)_6$, 1¼% HCl—½% $HNO_3$ 30-second tests run in duplicate on panels taken from production coils | | Salt spray, 48-hour tests on single panels taken from production coils, number of rust spots |
|---|---|---|
| Number of spots | Number of spots | |
| 26 | 29 | 25 |
| 2 | 4 | 3 |
| 1 | 2 | 0 |
| 3 | 2 | 2 |
| 2 | 3 | 4 |
| 2 | 4 | 0 |
| 0 | 0 | 1 |
| 2 | 1 | 3 |
| 0 | 2 | 1 |
| 4 | 1 | 1 |
| 1 | 2 | 3 |
| 1 | 2 | 3 |
| 2 | 1 | 2 |
| 0 | 1 | 0 |

Light gauge six-inch by twelve-inch panels of AISI type 430 stainless steel were mechanically buffed to improve the brightness of the surface of the steel and increase corrosion resistance. Corrosion testing was conducted as above on buffed and unbuffed samples. Results are shown below in Table II:

*Table II*

COMPARATIVE EXAMPLES OF TYPE 430 CORROSION RESISTANCE DETERMINED BY 30 SECOND $K_3Fe(CN)_6$ SPOT TESTS AND 48 HOUR SALT SPRAY TESTS

| Test [1] | 1% $K_3Fe(CN)_6$, 1¼% HCl—½% $HNO_3$ | | Salt spray (20% NaCl) | |
| --- | --- | --- | --- | --- |
| | Number of spots on buffed specimens | Number of spots on as received specimens | Number of spots on buffed specimens | Number of spots on as received specimens |
| 1 | | 5 large, 23 small | | 6 large, 28 small. |
| 2 | | 2 large, 22 small | | 2 large, 18 small. |
| 3 | 7 small | 1 large, 8 small | 1 large, 6 small | 2 large, 10 small. |
| 4 | 5 small | 1 large, 15 small | 6 small | 2 large, 11 small. |

[1] All specimens for each test were taken from the same general area of a single coil.

Four-inch by five-inch panels of type 430 stainless steel strip (all from the same lot) were tested by varying the acid concentration and the percent ferricyanide compound. All tests were run from panels from the same heat. Results are shown below in Table III:

*Table III*

| Percent $K_3Fe(CN)_6$ | Percent HCl | Percent $HNO_3$ | Percent acid by vol. | Results |
| --- | --- | --- | --- | --- |
| 1 | 71.43 | 28.57 | [1] 100 | Decomposition.[2] |
| 1 | 35.72 | 14.29 | 50 | Do. |
| 1 | 28.57 | 11.43 | 40 | Do. |
| 1 | 21.43 | 8.57 | 30 | Do. |
| 1 | 14.29 | 5.7 | 20 | Over-all attack. |
| 1 | 12.85 | 5.1 | 18 | Do. |
| 1 | 10.00 | 4.0 | 14 | Do. |
| 1 | 8.57 | 3.43 | 12 | Scattered areas of attack. |
| 1 | 7.14 | 2.86 | 10 | (Very slight over-all attack) 30 spots. |
| 1 | 3.57 | 1.43 | 5 | 20 to 30 spots. |
| 1 | 1.79 | .71 | 2.5 | Do. |
| 1 | 1.25 | .5 | 1.75 | 26 spots. |
| 1 | 1.25 | .5 | 1.75 | 25 spots. |
| .5 | 1.25 | .5 | 1.75 | 30 to 40 spots. |
| .1 | 1.25 | .5 | 1.75 | 40 to 50 spots. |
| .05 | 1.25 | .5 | 1.75 | 100 to 200 spots. |
| .025 | 1.25 | .5 | 1.75 | Do. |
| .0125 | 1.25 | .5 | 1.75 | Do. |

NOTE.—Standard 48-hour salt spray test (a spray of 20% NaCl in water at room temperature), 23 spots.

[1] The solution was made up with $K_3Fe(CN)_6$ and the concentrated acids without additions of water.
[2] The term "decomposition" indicates a general etching and dissolving of the test samples.

From the above, it may be seen from Tables I and II that the testing of the present invention correlates closely with the standard salt spray tests, although the latter tests require 48 hours of testing while the present test was conducted in a period of 30 seconds. It also may be observed from Table II that substantially the same results are obtained on identical test materials for the two tests.

It is shown by Table III that the total acid content of the test solution may not safely exceed about 10%, by volume, of the concentrated acids (in the ratio of 1 part HCl to 2.5 parts $HNO_3$) without effecting over-all attack or etching of the stainless steel surface.

Also, it is shown in Table III that concentrations of potassium ferricyanide falling below about .1% effect a false test by showing excessive numbers of blue spots.

We claim:

1. The method of determining the presence of potential corrosion on the surface of stainless steel which comprises contacting the surface of said steel with a material that is capable of absorbing liquids and an aqueous test solution that contains ferricyanide ions and from about .5% to 5% by weight, of a mixture of nitric and hydrochloric acid in a nitric acid to hydrochloric acid ratio range of from about 1:1 to 1:12 and separating said material from said stainless steel surface to permit the observance of blue spots appearing on said material and said steel surface that are indicative of potential corrosion.

2. The method of determining the presence of potential corrosion on the surface of stainless steel which comprises contacting the surface of said steel with a material that is capable of absorbing liquids and an aqueous test solution that contains ferricyanide ions in an amount equivalent to additions of at least .1%, by weight, of potassium ferricyanide and nitric and hydrochloric acids in a combined quantity equivalent to from 1% to 10% additions, by volume, of 37%, by weight, hydrochloric acid and 70%, by weight, nitric acid, said volume relationship of said nitric acid to said hydrochloric acid being in a ratio range of 1:2.25 to 1:2.75, and separating said material from said stainless steel surface to permit the observance of blue spots that appear on said material that are indicative of potential corrosion.

3. The method of determining the presence of potential corrosion on the surface of stainless steels which comprises contacting the surface of said stainless steel with a material that contains absorbed therein an aqueous test solution that contains at least .1%, by weight, of at least one compound selected from the group consisting of potassium ferricyanide and sodium ferricyanide and from about .5% to 5% by weight, of nitric and hydrochloric acids in a nitric acid to hydrochloric acid ratio range of from about 1:1 to 1:1.2, and separating said material from said stainless steel surface to permit the observance of blue areas appearing on said material that are indicative of potential corrosion.

4. The method of determining the presence of potential corrosion on the surface of stainless steels which comprises contacting the surface of said steel with a flexible flat material that contains absorbed therein a quantity of an aqueous test solution that contains at least .1%, by weight, of at least one compound selected from the group consisting of potassium ferricyanide and sodium ferricyanide and from about .5% to 5%, by weight, of nitric and hydrochloric acids in a nitric acid to hydrochloric ratio range of from about 1:1 to 1:1.2 and separating said flexible flat material from said stainless steel surface to permit the observation of blue areas appearing on said material that are indicative of potential corrosion.

5. The method of determining the presence of potential corrosion on the surface of AISI type 430 stainless steel strip which comprises contacting the surface of said strip with a flexible flat material that contains absorbed therein a quantity of an aqueous test solution that contains at least .1%, by weight, of potassium ferricyanide and from about .5% to 5%, by weight, of nitric and hydrochloric acids in a nitric acid to hydrochloric acid ratio range of about 1:1.1 and, after a period of from about 10 seconds to about 3 minutes, separating said flexible flat material from said strip surface to permit the observation of the blue areas appearing on said flexible flat material that are indicative of potential corrosion.

References Cited in the file of this patent

UNITED STATES PATENTS 1,753,301   Pitschner _____ Apr. 8, 1930

OTHER REFERENCES

Uhlig: Corrosion Handbook (1955), pp. 1033, 1016, 1017, 774.

Champion: Corrosion Testing Procedures (1952), p. 53.